(12) United States Patent
Siegel

(10) Patent No.: US 7,187,941 B2
(45) Date of Patent: Mar. 6, 2007

(54) SECURE NETWORK-ROUTED VOICE PROCESSING

(75) Inventor: Neil G. Siegel, Rancho Palos Verdes, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 216 days.

(21) Appl. No.: 10/295,744

(22) Filed: Nov. 14, 2002

(65) Prior Publication Data

US 2004/0203799 A1    Oct. 14, 2004

(51) Int. Cl.
*H04Q 7/20*    (2006.01)

(52) U.S. Cl. .................. 455/519; 455/517; 455/518; 455/445; 455/90.2; 455/521; 455/11.1

(58) Field of Classification Search .............. 455/11.1, 455/561, 550.1, 445, 518, 519, 521, 517, 455/520, 3.05, 404.1; 370/276, 280; 379/88.17, 379/88.29, 418
See application file for complete search history.

(56) References Cited

U.S. PATENT DOCUMENTS

| | | | |
|---|---|---|---|
| 4,578,815 A | | 3/1986 | Persinotti |
| 5,987,011 A | * | 11/1999 | Toh .............................. 370/331 |
| 6,104,712 A | * | 8/2000 | Robert et al. ............... 370/389 |
| 6,111,860 A | | 8/2000 | Braun |
| 6,119,179 A | | 9/2000 | Whitridge et al. |
| 6,212,559 B1 | | 4/2001 | Bixler et al. |
| 6,243,585 B1 | * | 6/2001 | Pelech et al. ................ 455/449 |
| 6,259,691 B1 | | 7/2001 | Naudus |
| 6,298,062 B1 | | 10/2001 | Gardell et al. |
| 6,327,267 B1 | | 12/2001 | Valentine et al. |
| 6,330,316 B1 | | 12/2001 | Donak et al. |
| 6,421,325 B1 | * | 7/2002 | Kikinis ........................ 370/280 |
| 6,449,491 B1 | * | 9/2002 | Dailey ......................... 455/518 |
| 6,600,928 B1 | * | 7/2003 | Ahya et al. .................. 455/518 |
| 2004/0063451 A1 | * | 4/2004 | Bonta et al. ................. 455/519 |
| 2004/0192331 A1 | * | 9/2004 | Gorday et al. ........... 455/456.1 |
| 2004/0198376 A1 | * | 10/2004 | Chandhok et al. ....... 455/456.1 |

* cited by examiner

*Primary Examiner*—Charles Appiah
*Assistant Examiner*—Willie J. Daniel, Jr.
(74) *Attorney, Agent, or Firm*—Tarolli, Sundheim, Covell & Tummino LLP

(57) ABSTRACT

Systems and methods are provided for routing voice communications through a mobile communication system having a self-contained infrastructure, such as a two-way radio communication system. The voice communications are transmitted as digitized voice packets over radio frequency links. The digitized voice packets contain one or more destination addresses in addition to other routing information. Routers receive the digitized voice packet and extract the routing information. The routing information is used in conjunction with a member router database to determine where to route the digitized voice packets.

23 Claims, 10 Drawing Sheets

SECURE NETWORK-ROUTED VOICE PROCESSING

CROSS-REFERENCE TO RELATED-APPLICATIONS

This application is related to commonly assigned application Ser. No. 10/295,274 filed Nov. 14, 2002, entitled "SECURE NETWORK-ROUTED VOICE MULTICAST DISSEMENATION", and application Ser. No. 10/294,793 filed Nov. 14, 2002, entitled "VOICE HUB PROCESSING" both of which are herein incorporated by reference.

TECHNICAL FIELD

The present invention relates to communications and, more particularly, to systems and methods for routing voice communications in a mobile communication network.

BACKGROUND OF THE INVENTION

The use of communication systems having wireless mobile communication units has become widespread. Wireless communication systems provide several important advantages over conventional wired systems. For example, wireless communication users can communicate in locations where wired service is not available or feasible, such as remote or rugged locations. Additionally, wireless communication users have much more mobility because they do not have to connect to a fixed wired network. These and other favorable characteristics make wireless communications ideally suited for personal, business, military, search and rescue, law enforcement, and water vehicle applications.

Common approaches to providing wireless communication systems are two-way radio systems and cellular systems. Cellular systems require fixed based stations such as cell towers that are coupled to a wired network. These types of systems are not practical when the entire network needs to remain mobile. Typically, two-way radio systems contain their own self-contained infrastructure, such that all of the mobile communication units (e.g., radios, data terminals, voice/data terminals) within a network need to be programmed to similar frequencies or channels.

Despite the benefits of two-way radios, they have several drawbacks. First, two-way radios typically support only half-duplex operation, meaning that only one user can talk at a time. A user must push a "talk" button to talk to another user and if both users push their "talk" buttons at the same time, then the users cannot hear each other. The reason for this is that all participants transmit data on the same channel. Two-way radios also require that users agree upon and select a particular channel to use for a conversation. A user can only talk to others tuned to the same parameters (e.g., frequency, modulation type, cryptographic settings, frequency-hopping settings). Typically, this means that a user can only talk to others that have similar types of radio equipment. If the channel being used is lost, or cannot be used because of excessive interference, then the users must transfer to a different channel, which in practice can be difficult to do because even if an alternate channel has been previously agreed upon it is often difficult to create a reliable method for all parties to determine that the original channel is no longer available.

Two-way radio systems are often line-of-sight-type radio systems. Military line-of-sight-type radios are typically VHF (Very High Frequency) or UHF (Ultra High Frequency) radios that broadcast in frequencies from about 30 MHZ to 300 MHZ, and have effective ranges of about 5–25 miles, based on RF power, the antenna/mast height used with the radio, and other factors. These VHF/UHF radio types have limited range capabilities, but are used because these radio bands can be highly reliable. Other radio types can at times provide beyond-line-of-sight service, for example, HF (High Frequency) radios. HF radios broadcast in frequency ranges from about 1 MHZ to about 20 MHZ, and can at times achieve much longer ranges than VHF/UHF radios. However, the HF radio broadcasts are much less reliable than the VHF/UHF radio broadcasts.

SUMMARY OF THE INVENTION

The following presents a simplified summary of the invention in order to provide a basic understanding of some aspects of the invention. This summary is not an extensive overview of the invention. It is intended neither to identify key or critical elements of the invention nor delineate the scope of the invention. Its sole purpose is to present some concepts of the invention in a simplified form as a prelude to the more detailed description that is presented later.

The present invention relates to systems and methods for routing voice communications through a mobile communication system. The mobile communication system can be configured to have a self-contained network infrastructure. The voice communications are transmitted as digitized voice packets over one or more radio frequency links. The digitized voice packets contain one or more destination addresses. One or more routers (e.g., mobile routers) are provided in the system that receive the digitized voice packet and extract the routing information. The routers can be integrated into mobile communication units, or be stand-alone devices forming part of the mobile communication system. The routing information is used in conjunction with a router database to determine where to route the digitized voice packets. The one or more routers can be adapted to receive and route voice communications to and from different radio types, communication protocols (e.g., channels, frequency hopping schemes) and security protocols (e.g., encryption, decryption).

The router database provides a router with information regarding connections of members (e.g., mobile communication units, routers) with one or more routers, and/or connections of members with the respective router itself. The router can receive configuration information from a configuration manager periodically that defines the network definition (e.g., member names, member physical and logical addresses, paths, task and member priority), and member parameters (e.g., communication parameters, security parameters, member types), and generate a router database. Administrative routines are executed periodically to update the router database.

In one aspect of the invention, the mobile communication system is a two-way radio communication system having a plurality of half-duplex line-of-sight radio devices configured as a network. At least one router is provided in the mobile communication system. The at least one router can be integrated into a two-way radio device or be a stand-alone router device. The router can be mobile, so that the entire network and coverage area of the entire network is mobile. Therefore, a fixed or pre-existing infrastructure, such as cell towers, relays, repeaters, satellites, etc., is not required. The router can be directly connected to one or more radio devices through different ports, so that the router can support radio devices of different types, radio devices having different frequency hopping schemes, and/or radio devices having different cryptographic variable sets.

To the accomplishment of the foregoing and related ends, certain illustrative aspects of the invention are described herein in connection with the following description and the annexed drawings. These aspects are indicative, however, of a few of the various ways in which the principles of the invention may be employed and the present invention is intended to include all such aspects and their equivalents. Other advantages and novel features of the invention will become apparent from the following detailed description of the invention when considered in conjunction with the drawings.

DETAILED DESCRIPTION OF THE INVENTION

The present invention relates to systems and methods for routing voice communications or voice messages through a mobile communication system having a plurality of members (e.g., mobile communication units, routers, central command center). The voice communications are transmitted as digitized voice packets over radio frequency links. The digitized voice packets contain one or more destination addresses in addition to other routing information (e.g., classification information, security information). The system includes one or more routers (e.g., mobile routers) that receive the digitized voice packets and extract routing information from the digitized voice packets. The routers can be built into mobile communication units, and/or be stand-alone router devices. The routers can be software routines, hardware, or a combination of hardware and software routines. The routing information is used in conjunction with a member router database to determine where to route the digitized voice packets. The one or more routers can be adapted to receive and route voice communications to and from different radio types, communication protocols (e.g., channels, frequency hopping schemes) and security protocols (e.g., encryption, decryption).

The present invention overcomes many of the disadvantages with conventional systems. For example, using this invention, voice transmission can be exchanged between different equipment types, and between radios in different radio networks having different communication parameters (e.g., frequency, modulation type, cryptographic settings, and/or frequency-hopping settings). Additionally, voice communications can reach radio devices when no line-of-sight is available, even while employing line-of-sight radios. Furthermore, voice communications can reach much longer geographic ranges than can be achieved by a single radio link.

Figure 1:
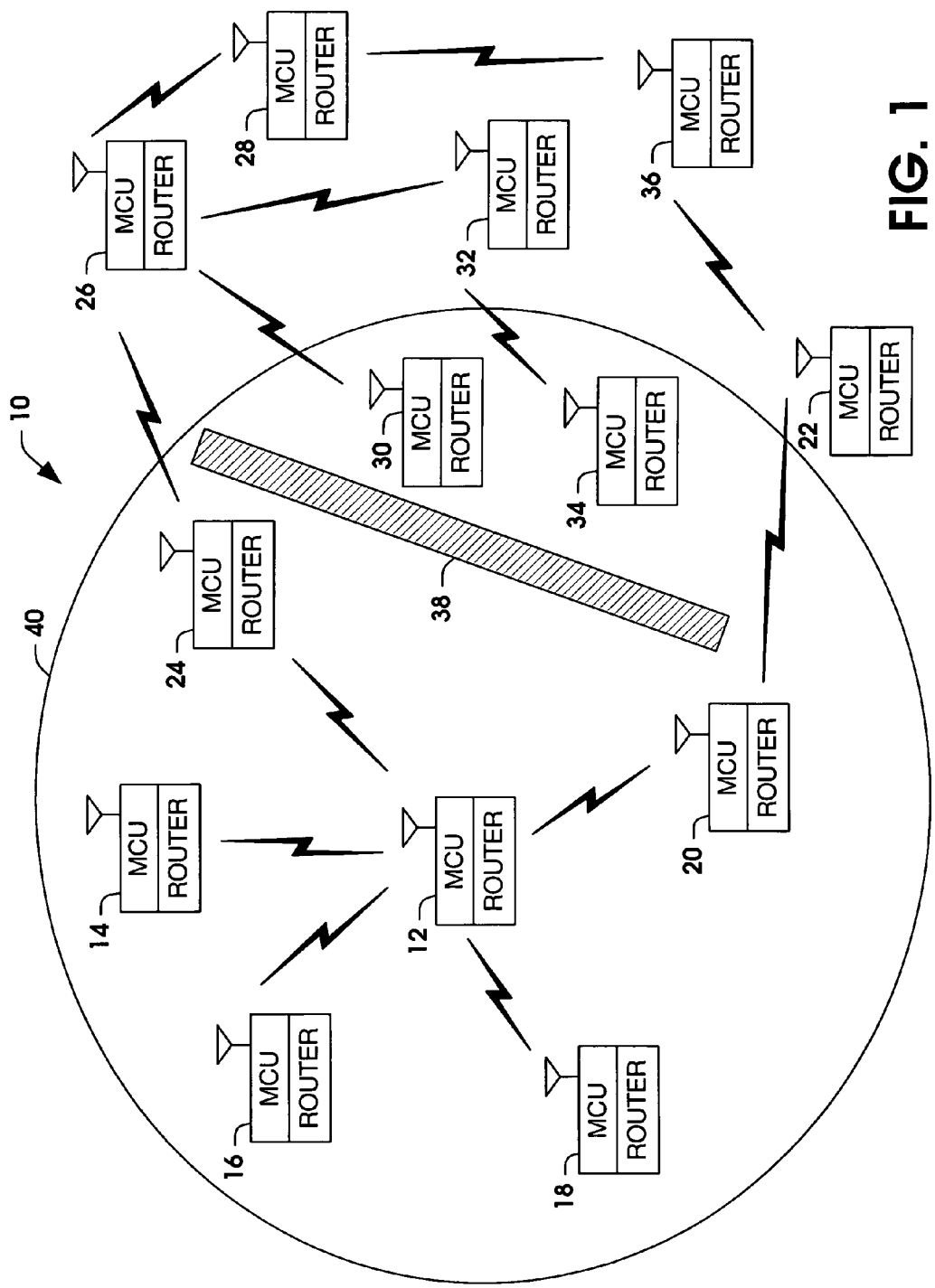
FIG. 1 illustrates a block diagram of a wireless communication system configured as a self-contained network infrastructure in accordance with an aspect of the present invention.

FIG. 1 illustrates a mobile communication system or network 10 in accordance with an aspect of the present invention. The mobile communication system 10 includes a plurality of mobile communication units (MCUs) 12–36 operative to communicate with one another wirelessly via respective antennas. The mobile communication units 12–36 transmit voice messages from one unit to one or more (e.g., 1 to N) of the other mobile communication units 12–36. The mobile communication units 12–36 can also transmit data information (e.g., administrative data, location data, configuration data, priority data, and application-specific data). The mobile communication system 10 can be, for example, a two-way radio communication system (e.g., a plurality of half-duplex line-of-sight radio units) configured as a self-contained radio communication network, such that the network has a self-contained infrastructure. Therefore, the network does not include a fixed base station or wired network serving as a central server.

The mobile communication units 12–36 have built-in-routers that route voice communications to other mobile communication units beyond the line-of-sight of a transmission and/or beyond a transmission limit of the transmitting mobile communication unit. The mobile communication system 10 includes a plurality of mobile communication units 14, 16, 18, 20, 24, 30 and 34 that reside in a transmission range 40 with respect to the mobile communication unit 12. The mobile communication units 12–36 move within the communication range of the system 10, such that the entire coverage range of the system 10 or network is mobile. The mobile communication units 12–36 include routers that are built-in or form part of the mobile communication unit. It is to be appreciated that stand-alone routers can be provided as part of the mobile communication system 10. The routers can route voice messages to the mobile communication units that cannot receive the voice messages directly.

In one aspect of the invention, the routers route all voice messages transmitted by one or more of the mobile communication units 12–36. The routers can provide voice communication to mobile communication units beyond the line-of-sight of a transmitting mobile communication unit. The routers can also provide voice communications to mobile communication units outside of the transmitting range of a transmitting mobile communication unit. In one aspect of the present invention, the routers are programmed to route voice communications between mobile communication units that are of different radio types, different frequency hop-sets, and/or different cryptographic variable sets. The routers are dynamically updated to determine when a new member (e.g., mobile communication unit, router) enters the network. The respective router is then provided with information related to parameters (e.g., radio type, frequency hop-set, cryptographic variable set, network or subnetwork address) associated with the new member.

A speech pattern or voice message is provided to a microphone of a mobile communication unit, which is then amplified and converted into digitized voice data. The digitized voice data can be in the form of digitized voice packets, such as Voice Over Internet Protocol (VOIP) packets, Network Voice Protocol (NVP) packets, or any other form of digitized voice or digitized speech data. Identification information is then added to the digitized voice data, for example, in a header for each packet. The header can contain data type, data source, data destination, data security, data classification, and data priority information. One or more packets associated with the voice message are built, and (optionally) encrypted for security purposes. A variety of encryption mechanisms (e.g., hashing, key pairs) can be employed to encrypt the packet. The packets are then converted to an RF signal to be transmitted over the air via one or more radio frequency links. The RF signal can be modulated and transmitted over the air as modulated radio transmission waves or electromagnetic waves. Additionally, the mobile communication units and the routers can be programmed to frequency hop according to a predefined frequency-hopping scheme over N number of channels, where N is a positive integer.

In the example of FIG. 1, a mobile communication unit 12 is transmitting a voice signal or voice message, having the transmission range 40, to all members of the system 10. The voice signal is received directly by mobile communication units 14, 16, 18, 20 and 24. The mobile communication units 14, 16, 18, 20 and 24 demodulate the voice signal and convert the voice signal to digital voice data. If the voice messages are transmitted with a frequency-hopping scheme, the mobile communication units 14, 16, 18, 20 and 24 employ the frequency-hopping scheme to receive the voice data via respective routers. If the voice data are encrypted, the digital voice data can be decrypted prior to further processing. The respective router then reads the header information to determine the sender of the voice data, the destinations of the voice data, in addition to other overhead, priority, and identity information with respect to the voice data.

The routers can employ a router database to determine members connected to the destination units, and how to send the voice data to that particular mobile communication unit. For example, the router database can provide information regarding the particular mobile communication units within the range of the router, the radio type, the frequency hop-set and the cryptographic variable set. The routers can then employ this information to transmit the voice data to one or more of the respective mobile communication units.

The mobile communication units 30 and 34 are disposed behind a line-of-sight obstruction 38 out of the line-of-sight of the mobile communication unit 12. The line-of-sight obstruction 38 can be, for example, a building, a mountain, or some other object or objects that block a direct line-of-sight transmission of the voice data to the mobile communication units 30 and 34 from unit 12. The mobile communication units 22, 26, 28, 32 and 36 reside out of the transmission range of the mobile communication unit 12. Therefore, a direct transmission from the mobile communication unit 12 to any of the mobile communication units 22, 26, 28, 32 and 36 will not reach the mobile communication units 22, 26, 28, 32 and 36. The router of the mobile communication unit 24 routes the voice messages in the form of voice data to the mobile communication unit 26. The router of the mobile communication unit 26 routes the voice message in the form of voice data to the mobile communication units 28, 30 and 32, and the router of the mobile communication unit 32 routes the voice message in the form of voice data to mobile communication unit 34, thus removing the line-of-sight obstruction 38 and enhancing the transmission range of the mobile communication unit 12. The routers of the mobile communication units 24, 26, and 32 receive the voice messages transmitted from the mobile communication unit 12, and routes the voice messages to the mobile communication units 28, 30, 32 and 34, respectively, regardless of radio type, cryptographic variables and frequency hop sets.

The router of the mobile communication unit 28 and/or the router of mobile communication unit 22 determine that a new mobile communication unit 36 has entered the system 10 and desires to join the network. The router of the mobile communication unit 28 and/or the router of mobile communication unit 22 then retrieve information from the mobile communication unit 36 and add information relating to the mobile communication unit 36 to its respective router database. The router of the mobile communication unit 36 then provides administrative information that is relayed to routers of other mobile communication units 12–34, so that the routers can update their respective router databases. The appropriate administrative and routing information is also sent automatically to mobile communication unit 36, so that it could route to and from additional-units when called upon to do so. All of this generation and exchange of administrative and routing information is automatic.

For example, the administrative information can be relayed back to the mobile communication unit 12 through the mobile communication units 22 and 20. Alternatively, the administrative information can be relayed back to mobile communication unit 12 through the mobile communication units 28, 26 and 24. The mobile communication unit 12 can then transmit the administrative information directly and/or indirectly to the remaining members of the mobile communication system 10. It is to be appreciated that administration information can be retrieved from routers and/or the mobile communication units periodically to facilitate dynamic updating. Additionally, voice data can be routed from the mobile communication unit 36 to the mobile communication unit 12 through routers of one or more mobile communication units. The routers can be operative to determine an optimal path for the routing based on one or more parameters (e.g., time, priority, router location, mobile communication unit location, bandwidth, load sharing).

Figure 2:
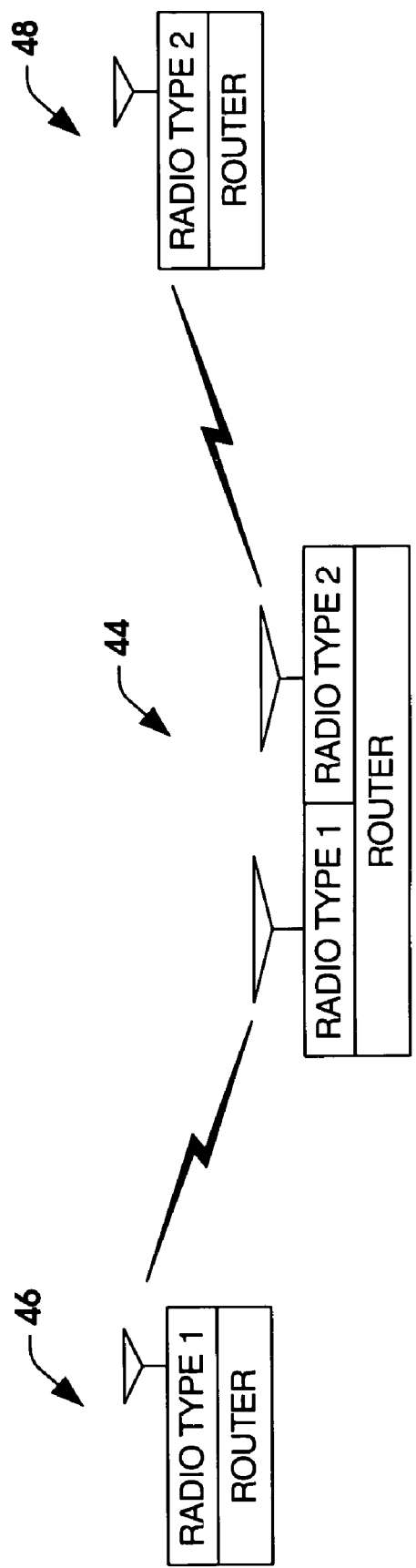
FIG. 2 illustrates a block diagram of one particular arrangement for providing communication between different types of radio equipment in accordance with an aspect of the present invention.

FIG. 2 illustrates one particular arrangement for providing communication between different types of radio equipment in accordance with an aspect of the present invention. A first mobile communication unit 44 is comprised of a first radio type and a second radio type both coupled to a router. The first radio type is operative to receive and transmit communications between similar radio equipment types as the first radio type, while the second radio type is operative to receive and transmit communications between similar radio equipment types as the second radio type. The router of the first mobile communication unit 44 is operative to receive communications through both the first radio type and the second radio type, and convert and route that communication to either or both radios of the first radio type and the second radio type. A second mobile communication unit 46 is comprised of a first radio type and a router and a third mobile communication unit 48 is comprised of a second radio type and a router. A communication from the second mobile communication unit 46 to the third mobile communication unit 48 is routed through the first mobile communication unit 44. Specifically, the communication from the second mobile communication unit 46 is received by the first radio type of the first mobile communication unit 44. The router of the first mobile communication unit 44 determines that the destination is the third mobile communication unit 48 and reformats the communication for radios of the second type. The communication is then transmitted from the first mobile communication unit 44 through the second radio type to the third mobile communication unit 48. Additionally, the communication can be transmitted through the first radio type of the first mobile communication unit 44 to other destination mobile communication units of the first type.

Figure 3:
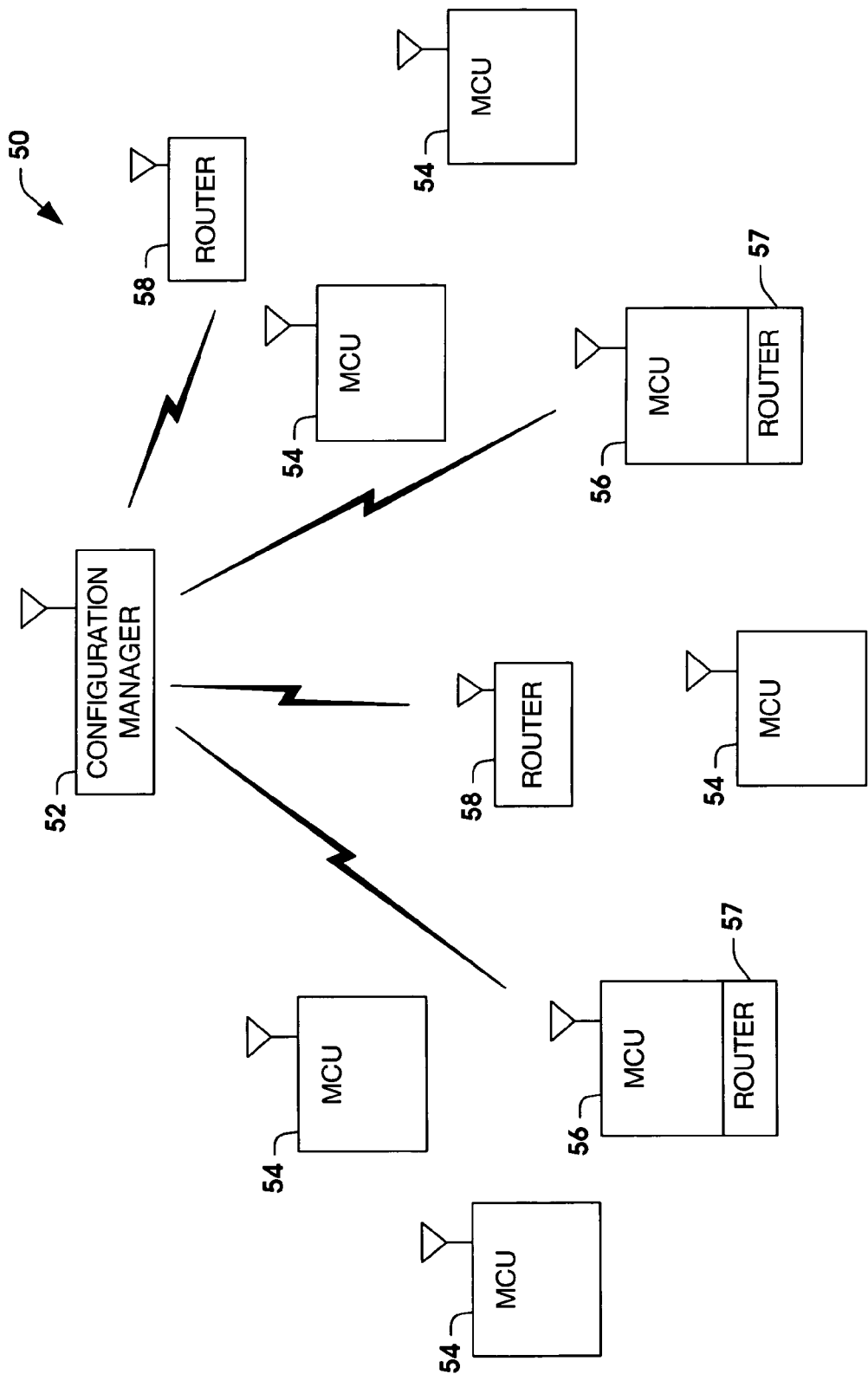
FIG. 3 illustrates a block diagram of a wireless communication system having a configuration manager in accordance with an aspect of the present invention.

The routers can be preprogrammed prior to placement in the field, and/or periodically programmed by a configuration manager. FIG. 3 illustrates a mobile communication system 50 utilizing a configuration manager 52 (which can itself be mobile) to program one or more routers in accordance with an aspect of the present invention. The mobile communication system 50 includes a plurality of mobile communication units (MCU) operative to transmit voice signals wirelessly via respective antennas. The mobile communication units can also transmit data information (e.g., administrative data, location data, configuration data, priority data). The mobile communication system 50 can be, for example, a two-way radio communication system configured as a self-contained radio communication network, such that the network has a self-contained infrastructure.

The mobile communication system 50 includes a plurality of mobile communication units 56 having built-in routers 57, a plurality of stand-alone mobile communication units 54 and a plurality of stand-alone routers 58. A configuration manager 52 is provided that programs the routers to facilitate routing of voice messages between the mobile communication units. The configuration manager 52 transmits configuration messages to the routers periodically. The configuration messages contain information defining the network. The definition of the network can include, for example, network member identifiers, the physical location of the members, the relationship between the physical and logical addresses and the interconnection path between the members.

The physical address is a unique numerical or other code that uniquely defines the member and the local network to which it is connected. The logical address is usually a name or label associated with the member or the person using it. The logical address, which may include a person's name, is the address other users employ to direct messages to the person without having to remember or look up a long and complicated physical address. The configuration messages also contain information relating to member types (e.g., radio types, router types), communication characteristics (e.g., different frequency hop-sets), member security information (e.g., cryptographic variable sets), member and task priority information, network parameters and configuration timing information.

Once configured, the routers are programmed to create a router database, and employ the router database in routing voice messages from one mobile communication unit to other mobile communication units and/or routers. Additionally, the routers are programmed to perform automatically administration updates (e.g., a dynamic routing protocol) based on movement of members and location of the member with respect to the routers. The administrative updates can be transmitted between the routers, such that the routers can update their respective network router database. The routers can also determine optimal transmission paths to route the voice message to desired receivers, for example, through other routers and/or mobile communication units. The optimal transmission paths can be determined using statistical modeling, decision modeling, bayesian modeling, or other decision techniques. Each router's optimal path can be based on one or more parameters (e.g., time, priority, router location, mobile communication unit location, bandwidth, load sharing).

Figure 4:
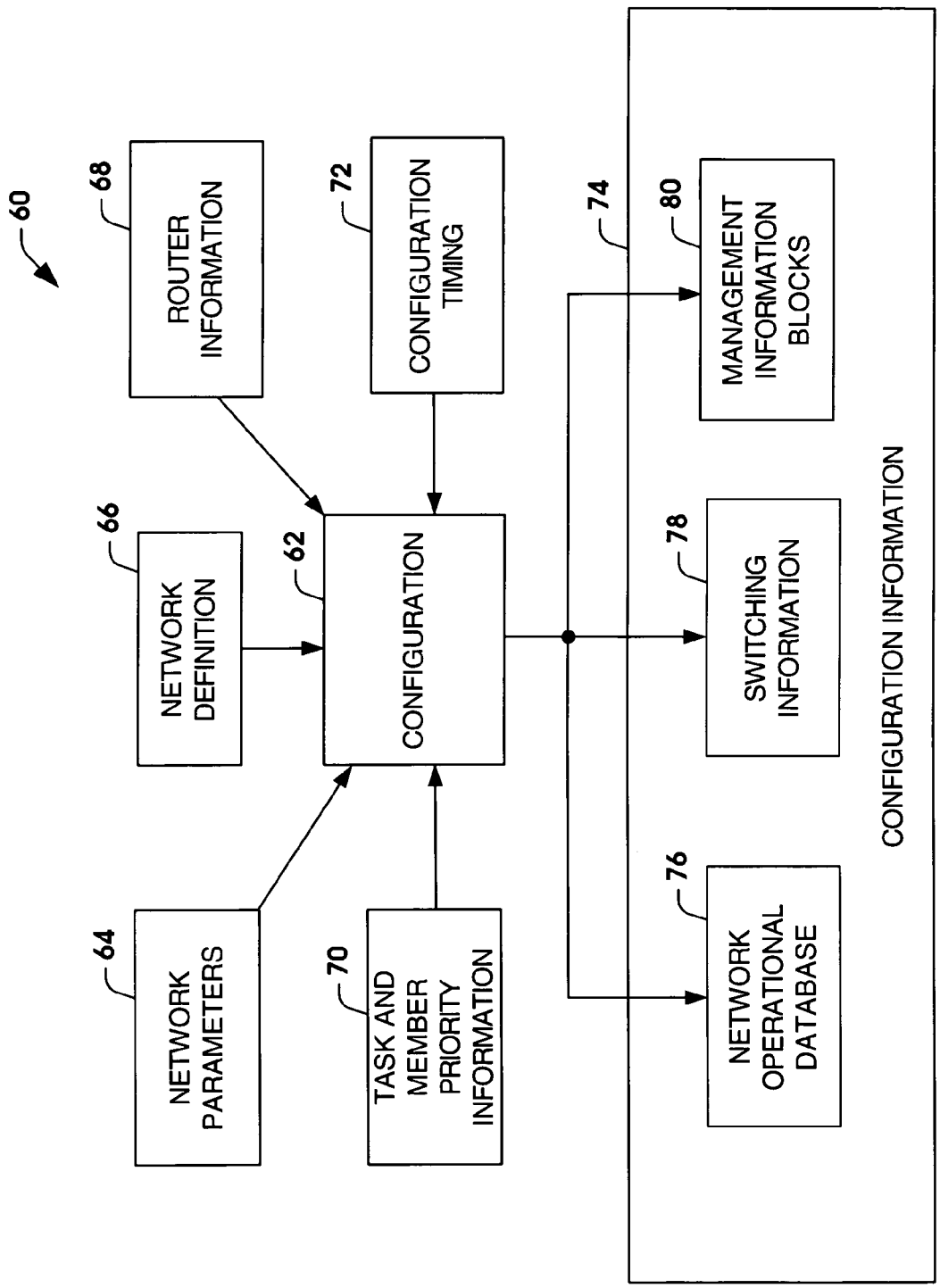
FIG. 4 illustrates a functional block diagram of a configuration manager in accordance with an aspect of the present invention.

FIG. 4 illustrates a functional block diagram of a configuration manager 60 in accordance with an aspect of the present invention. The configuration manager 60 includes a configuration component 62 that is provided one or more configuration parameters from an operator or user, and generates configuration information 74 to one or more routers. The information includes a network definition 66 defining the members of the network, for example, the mobile communication units or two-way radios, physical and logical address information with respect to the members, and initial network connection information. The information also includes router information 68 defining the available routers in the system, physical and logical address information about the routers, and any other information relating to the routers. Network parameter information 64 defines the member type parameters (e.g., radio types), member communication parameters (e.g., channels, frequency hopping parameters), and member security parameters (e.g., encryption parameters, decryption parameters).

The configuration component 62 also receives task and member priority information 70 and configuration timing information 72. The task and member priority information 70 defines the priority of information that is transmitted between the mobile communication units. For example, voice messages typically have priority over data messages. However, in some circumstances, data messages may be more important, and take priority over data messages. Alert messages can take priority over all other messages. Additionally, the task and member priority information provides membership priority. For example, certain members (e.g., leaders) have priority over other members (e.g., general members), such that their voice messages should be transmitted as a priority over other members. The configuration timing information 72 informs the members when to switch over to the new configuration.

The configuration component 62 then generates the configuration information 74. The configuration information 74 includes a network operational database 76, a set of switching information 78, and a set of management information blocks 80. The network operational database 76 defines the members of the network, priorities, and initial network connections. The switching information informs the member when it is time to switch over to the new connection, for example, at a predetermined time or immediately. The management information blocks contain data for reconfiguring members in the network in accordance with the new configuration.

The configuration manager 60 transmits the configuration information including data from the network operational database and management information blocks to the routers. Transmission can be made in a standard format, such as the simple network management protocol (SNMP). SNMP is designed to facilitate monitoring of network bridges and routers, but the same protocol can be used in the present invention to control and program bridges and/or routers in accordance with a new configuration.

Figure 5:
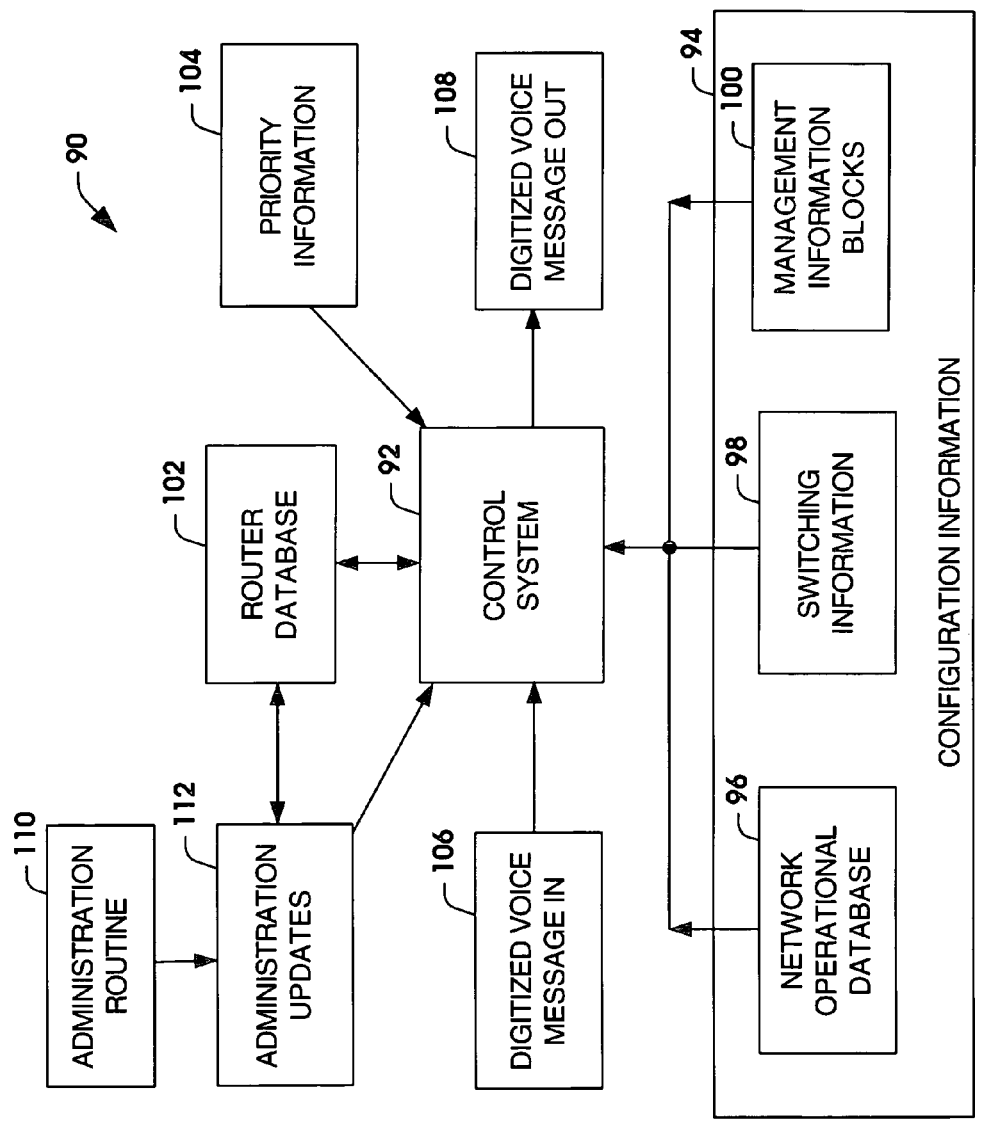
FIG. 5 illustrates a functional block diagram of a router in accordance with an aspect of the present invention.

FIG. 5 illustrates a functional block diagram of a router 90 in accordance with an aspect of the present invention. The router 90 includes a control system 92 that receives digitized voice messages as input (on any of M ports of the router, M being an integer greater than or equal to 2) addressed to one or more mobile communication units, and forwards these digitized voice messages as output (on any M−1 of the M ports of the router) that can contain additional routing information to assure that the voice data reaches the appropriate mobile communication units. The control system 92 receives configuration information 94 from a configuration manager. The configuration information 94 includes a network operational database 96, a set of switching information 98 and a set of management information blocks 100. The network operation database 96 defines the members of the network, priorities and initial network connections. The switching information informs the router 90 when it is time to switch over to the new connection, for example, at a predetermined time via a trigger signal or immediately upon receiving the new configuration information. The management information blocks 100 contain data for reconfiguring the router 90 in the network in accordance with the new configuration.

The control system 92 utilizes the configuration information in creating an initial router database 102. The control system 92 can also use a priority information set 104 to determine message priorities. The router database 102 includes information relating to routing connections to the mobile communication units within the network, and communication parameters associated with the mobile communication units. An administration routine 110 periodically executes to determine which mobile communication units and routers are within communication range of the router 90 and provides administration updates 112 based on the determination. The administrative updates 112 also include the router databases of other routers, such that optimal transmission paths can be determined for transmitting voice messages to members outside the router 90. The administrative updates 112 are provided to the router database 102 to continuously update the router 90 with information relating to members within the communication range of the router 90.

The control system 92 extracts routing information from the digitized voice message received as input addressed to one or more mobile communication units. For example, the routing information can include information relating to the sender of the voice message, a member list for which the voice message is intended, and an expected optimal path determined by the sender. The control system 92 then determines if the desired voice message is for any device coupled to the router 90, and removes the member from the member list and provides the message in the form of digitized voice data to the coupled member. The control system 92 then determines if the optimal path has changed and reconfigures the optimal path if it has changed. The control system 92 then reconfigures the routing information in the digitized voice message in 106, and provides the new routing information and member list in the digitized voice message out 108. The digitized voice message out 108 can then be transferred to members on a member list and additional routers if necessary.

Figure 6:
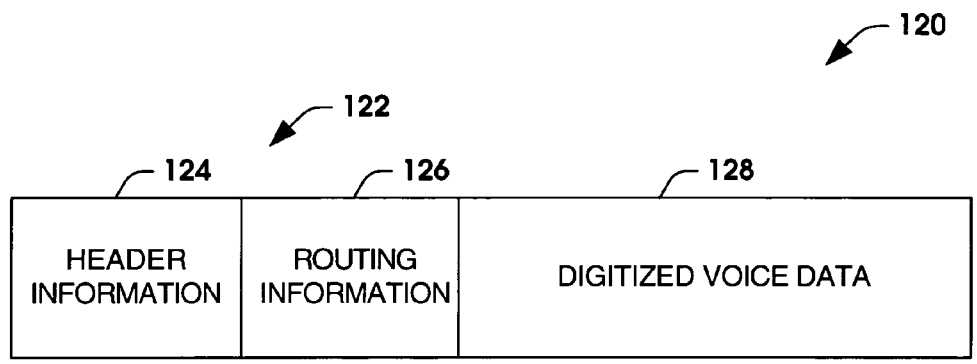
FIG. 6 illustrates a digitized voice packet having routing information in accordance with an aspect of the present invention.

FIG. 6 illustrates a digitized voice packet 120 including routing information in accordance with an aspect of the present invention. The digitized voice packet 120 includes a header portion 122 and a voice data portion 128. The voice data portion 128 includes digitized voice data, such as a voice packet (e.g., VOIP packet, NVP packet). The header portion 120 includes both header or identifier information 124 and routing information 126. The routing information 126 is provided to the header portion 122, so that the routers and/or mobile communication units can use this information in conjunction with the router database to route the digitized data to the desired location.

Figure 7:
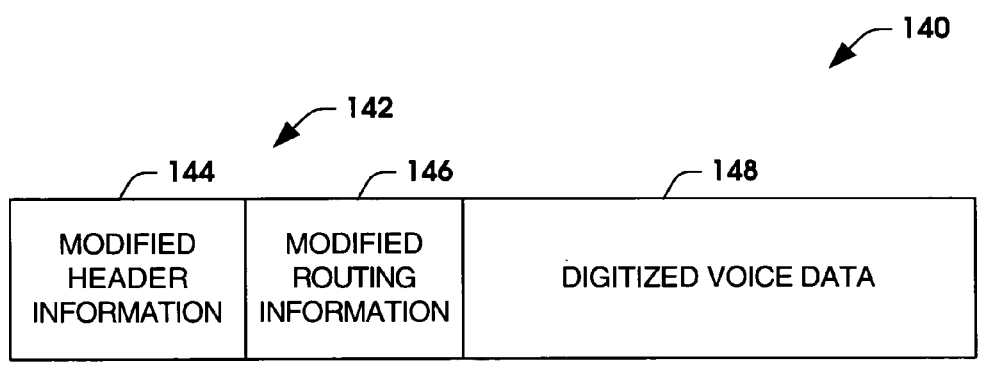
FIG. 7 illustrates a digitized voice packet having routing information that is modified by a router in accordance with an aspect of the present invention.

FIG. 7 illustrates a modified digitized voice packet 140 including modified routing information 146 updated by a router in accordance with an aspect of the present invention. The digitized voice packet 140 includes a modified header portion 142 and a voice data portion 148. The voice data portion 148 includes digitized voice data, such as a voice packet (e.g., VOIP packet, NVP packet) that is the same as when the digitized voice packet 140 was received by the router. The header portion 142 includes a modified header or identifier information 144, and modified routing information 146. The modified routing information 146 contains new routing information changed by the router based on a new optimal path associated with the members (e.g., mobile communication units, other routers) that the router can connect to and the remaining members for which the voice transmission is to be routed.

Figure 8:
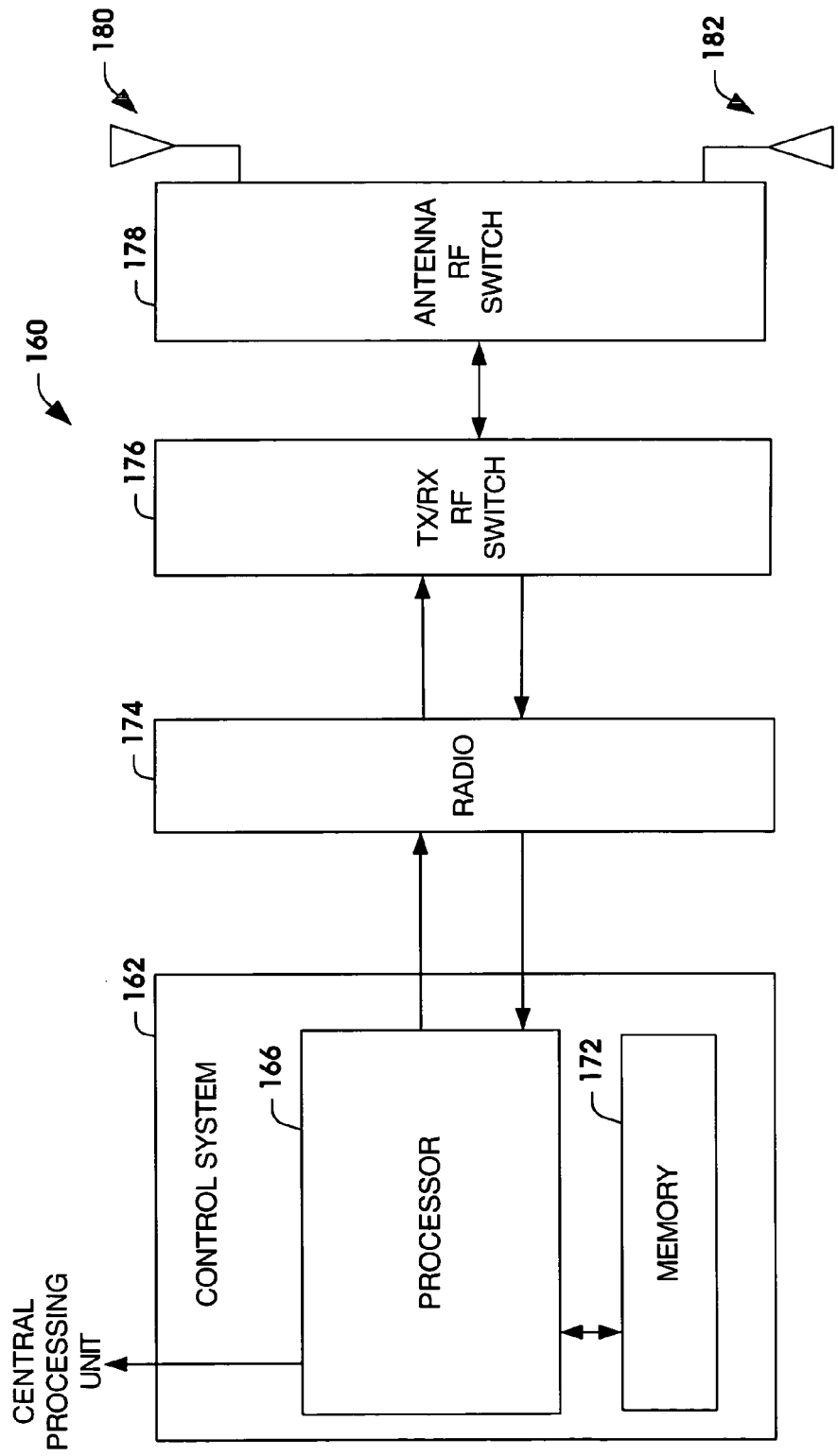
FIG. 8 illustrates a block diagram of a wireless router in accordance with an aspect of the present invention.

FIG. 8 illustrates a block schematic diagram of a wireless router 160 in accordance with an aspect of the present invention. The wireless router can be integrated into a mobile communication unit or be a stand-alone device. The wireless router 160 provides voice communications between one or more mobile communication units. The wireless router 160 includes a control system 162 that processes voice messages received from a mobile communication unit (e.g., half-duplex two-way radio), and routes the voice message to one or more other mobile communication units and/or a central processing unit. The central processing unit can be a central command center or station that provides a task and/or coverage area overview of the entire network. For example, the central command center can be a search and rescue command center where information (e.g., geographic, environmental, location) can be made available for communication to other members throughout the wireless network. The central command center can be a battlefield command center where information (e.g., geographic, environmental, location) can be made available to soldiers on a battlefield.

The control system 162 includes a processor 166 coupled to a memory 172. The processor 166 executes algorithms in the memory 172 that facilitate communications to and from the mobile communication units. The processor 166 transmits communications to a radio component 174. The radio component 174 is coupled to a transmit and receive radio frequency (TX/RX RF) switch 176 which selects between transmitting and receiving communications. The TX/RX RF switch 176 is coupled to an antenna RF switch 178. The antenna RF switch 178 selects between one or more antennas for capturing and transmitting communications with members of a network (not shown) within the wireless communication system.

The wireless router 160 receives voice communications through an antenna 180 and an antenna 182. The voice communications are transferred through the antenna RF switch 178, the TX/RX RF switch 176 and the radio component 174 to the control system 162. The control system 162 receives the voice communications as digitized voice packets. The received digitized voice packets are processed by the processor 166. The processor 166 can also be operative to decrypt, demodulate and perform frequency conversions of the digitized voice packets. The processor 166 then extracts the routing information from the voice packet headers.

If the voice packets are for the central processing unit, the processor 166 removes the header and transmits the voice packets to the central processor where the voice packets can be converted to speech. If the voice packets have additional destinations, the processor 166 determines the optimal routing path and modifies and/or adds routing information into the voice packet headers. The processor 166 then provides the appropriate encryption, communication frequencies, modulation and desired communication protocol based on the destination of the voice data. The protocol for the voice packets can be selected to conform to a desired standard (e.g., VOIP, NVP) throughout the network or system.

Figure 9:
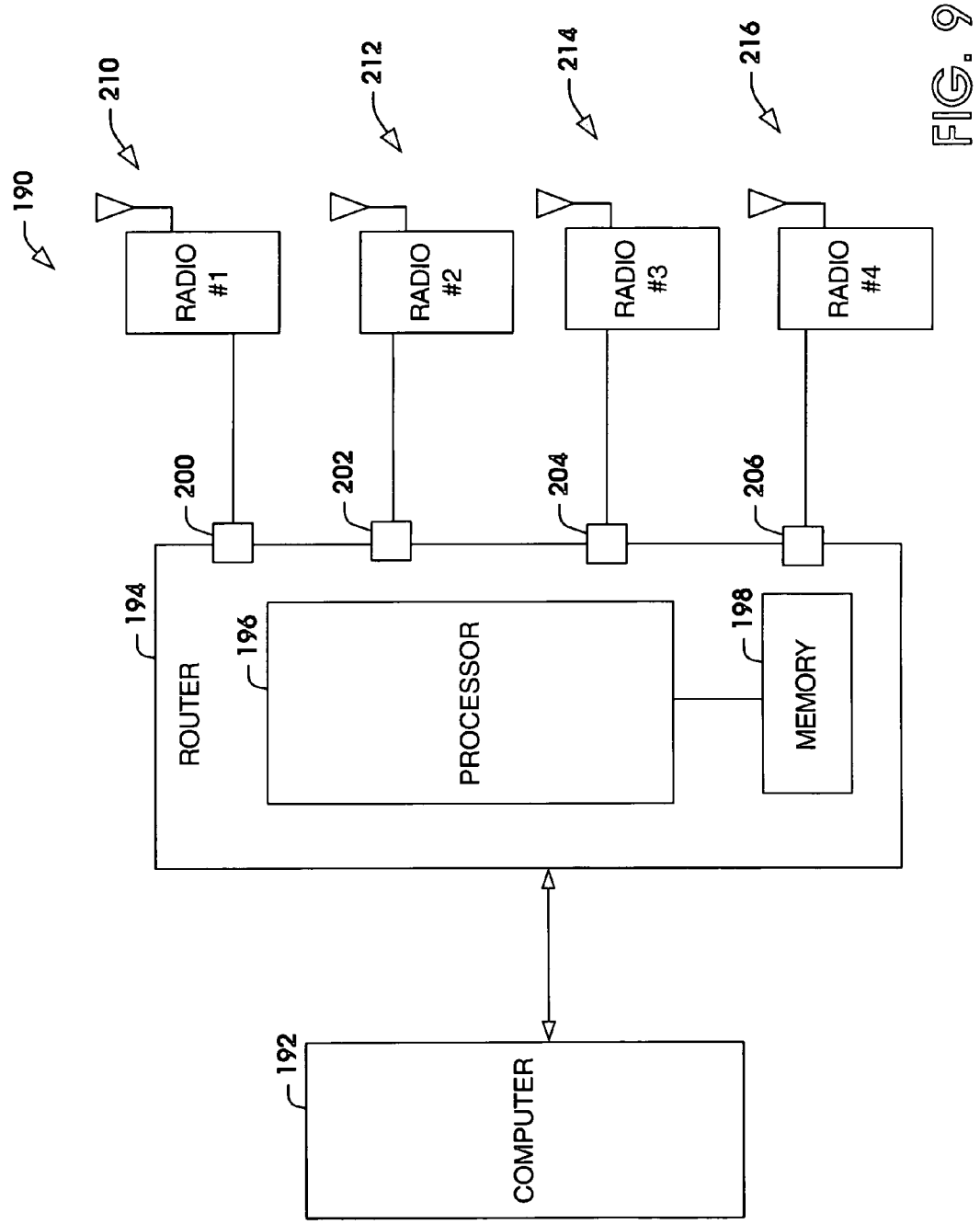
FIG. 9 illustrates a block diagram of a router system using different radio types in accordance with an aspect of the present invention.

FIG. 9 illustrates a block diagram of a router system 190 for a two-way radio communication system in accordance with an aspect of the present invention. The router system 190 includes a router 194 coupled to a first radio 210 through a first port 200, a second radio 212 through a second port 202, a third radio 214 through a third port 204 and a fourth radio 216 through a fourth port 206. Although, four ports and four radios are depicted in FIG. 9, an actual implementation could have more or fewer ports and radios. The first port 200, the second port 202, the third port 204 and the fourth port 206 can be different port types. For example, the ports 200–206 can be any of RS-232 ports, RS-422 ports, RS-485 ports, USB ports, parallel ports, IEEE standard ports and LAN connections. The first radio 210, the second radio 212, the third radio 214 and the fourth radio 216 can be radios of different types, communicating with different frequency hopping schemes, different encryption schemes, different modulation schemes using different protocols.

In one aspect of the invention, the radios are half-duplex radios. Each radio can be operative to communicate with a different set of radios in a wireless network. The different set of radios can be configured to operate as subnets of an overall network. Therefore, communication from one subnet or set of radios can be transmitted to the router 194, which determines routing information within voice messages to route the voice message from one radio in a first subnet to radios in one or more other subnets.

The router 194 includes a processor 196 coupled to a memory device 198. The memory device 198 provides the processor 196 with appropriate algorithms to route voice messages from one radio subnet to one or more other radio subnets. For example, the processor 196 can be programmed to decrypt and/or decipher voice data in one protocol from a first radio type, and provide a separate encryption and protocol to the voice data to send through a second radio type. The processor 196 also extracts routing information from the voice data and transmits the voice data to a second router system or directly to specific radios in a desired subnet. Voice packets can be queued in the memory device 198 for transmitting according to priority to multiple subnets. An optional computer 192 can be coupled to the router 194. The computer 192 can be configured to operate as a configuration manager as discussed in FIG. 4.

Figure 10:
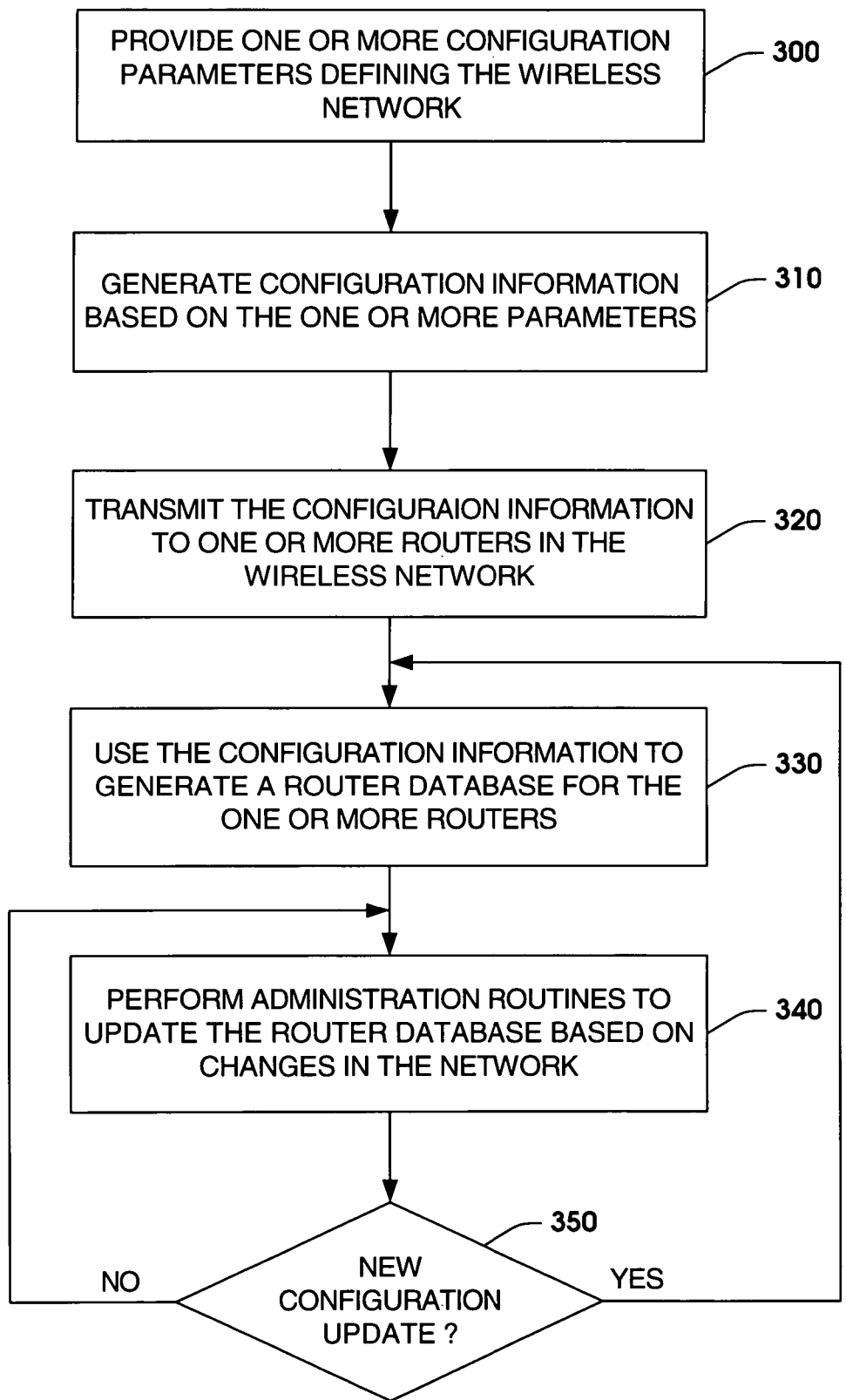
FIG. 10 illustrates a flow diagram of a methodology for configuring routers in a wireless network system in accordance with an aspect of the present invention.
Figure 11:
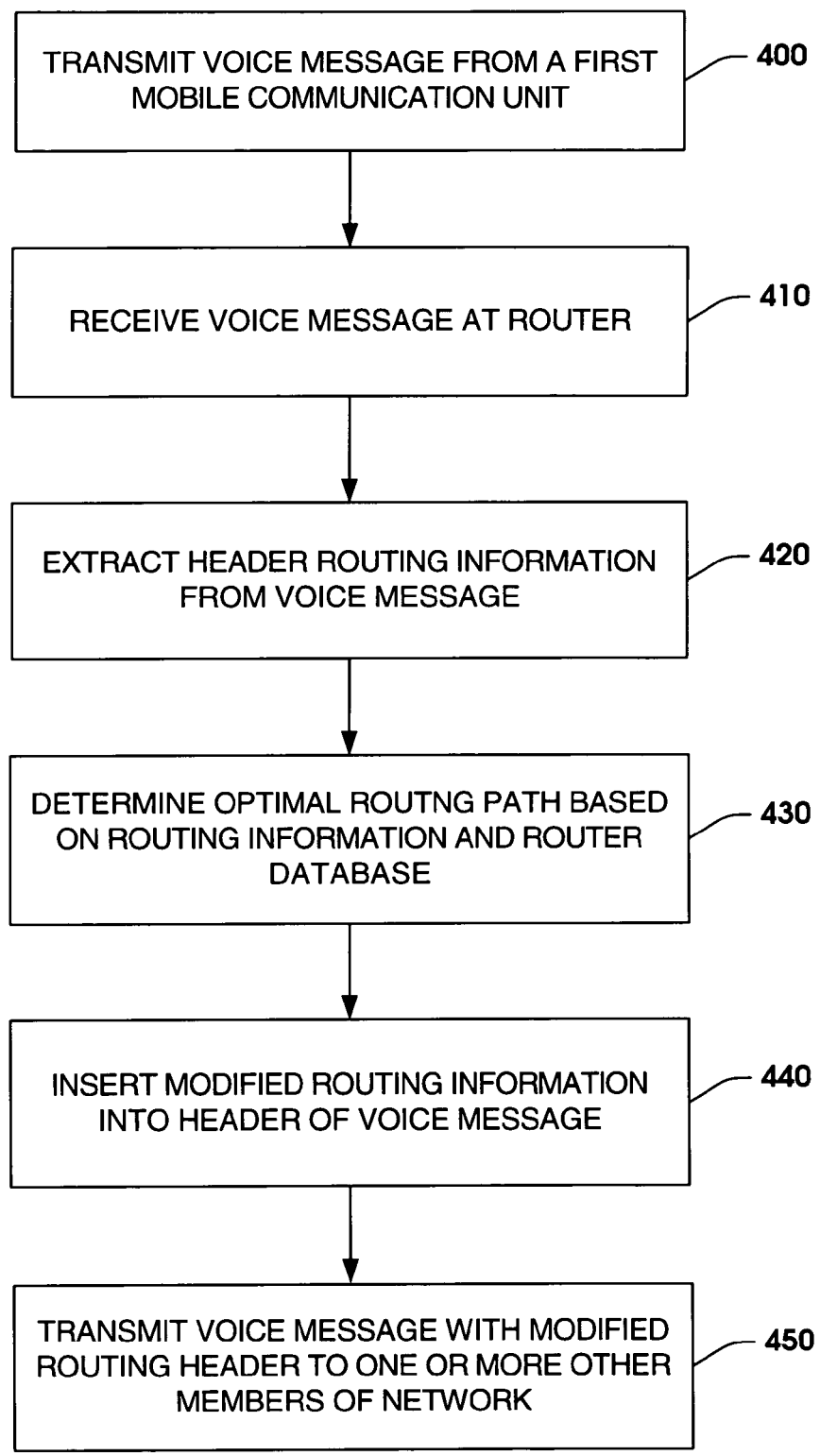
FIG. 11 illustrates a flow diagram of a methodology for transmitting a voice message in accordance with an aspect of the present invention.

In view of the foregoing structural and functional features described above, methodologies in accordance with various aspects of the present invention will be better appreciated with reference to FIGS. 10–11. While, for purposes of simplicity of explanation, the methodologies of FIGS. 10–11 are shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect the present invention.

FIG. 10 illustrates a methodology for configuring a wireless network having a self-contained infrastructure in accordance with an aspect of the present invention. The wireless network can be a plurality of half-duplex two-way radio devices configured as a network. The radio devices can have integrated routers and/or stand-alone routers can be included in the network. The radio devices can be operative to transmit voice messages that are digitized during processing and routed by the radios and routers. The methodology begins at 300 where one or more configuration parameters defining the wireless network are provided.

The one or more configuration parameters can be inputted into a configuration manager that resides, for example, on a central computer. The one or more configuration parameters can include, for example, members of the network, physical and logical address information with respect to the members, and initial network connection information. The information can also include router information, physical and logical address information about the routers, and any other information relating to the routers. The one or more configuration parameters can include the member type parameters (e.g., radio types), member communication parameters (e.g., channels, frequency hopping parameters), member security parameters (e.g., encryption parameters, decryption parameters), configuration timing and task and member priority information.

The methodology then proceeds to 310 to generate configuration information based on the one or more parameters. The configuration information includes a network operational database defining the members of the network, priorities and initial network connections, switching information that informs the routers when it is time to switch over to the new configuration and a set of management information blocks. The management information blocks contain data for reconfiguring members in the network in accordance with the new configuration. The methodology then proceeds to 320. At 320, the methodology transmits the configuration information to one or more routers in the wireless network.

At 330, the one or more routers utilize the configuration information to generate respective router databases for the one or more routers. The methodology then proceeds to 340. At 340, administration routines are performed by the routers to update the router databases based on changes in the network. The administration routines provide the routers with information regarding the members (e.g., radios, routers) within the range of the respective routers. The administration routines then provide this information to the other routers, such that the routers can determine paths to route the voice messages to intended receivers (e.g., selected radios).

The methodology then advances to 350 to determine whether a new configuration update has been received. If a new configuration update has been received (YES), the methodology returns to 330 to use the configuration information to generate new router databases based on the new configuration update. If a new configuration update has not been received (NO), the methodology returns to 340 to repeat the administration routines performed by the routers to periodically update the router database based on changes in the network.

FIG. 11 illustrates a methodology for transmitting voice messages in accordance with an aspect of the present invention. The methodology begins at 400 where a first mobile communication unit (e.g., half-duplex two way radio) transmits a voice message to one or more (1 to N) other mobile communication units (e.g., other half-duplex two way radios). The voice message is received at a router at 410. The router can be integrated into the mobile communication unit, or be a stand-alone device. At 420, the router extracts routing information from voice packets forming the voice message. At 430, the router then determines the optimal routing path of the voice messages based on routing information and the router database residing in the router itself. Other considerations can be employed to determine the routing path based on one or more parameters (e.g., time, priority, router location, mobile communication unit location, bandwidth, load sharing).

The methodology then advances to 440. At 440, the router inserts modified routing information into the header of one or more packets forming the voice message. The modified routing information can be provided to other routers for continued routing to corresponding members. Alternatively, the modified routing information can be used to inform the destination mobile communication units of which members transmitted and/or routed the voice message. In some situations, the headers are stripped from the voice data and discarded. For example, if the destination of the voice message is the router or device connected to the router and no further routing of the voice message is desired, the header can be discarded and the voice message played by the device (e.g., mobile communication unit). At 450, the voice message with packets having modified routing headers is transmitted to one or more other members in the network.

What has been described above includes exemplary implementations of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

The invention claimed is:

1. A wireless communication system comprising:
a plurality of mobile communication units, each mobile communication unit being operative to convert speech patterns to a voice message and wirelessly transmit the voice message to one or more other mobile communication units, the plurality of mobile communication units being configured as a self-contained mobile network infrastructure, at least one of the plurality of mobile communication units comprising an integrated router that comprises a router database defining connections to members of the self-contained mobile network infrastructure, such that the router receives the voice message from at least one of the plurality of mobile communication units, extracts routing information comprising a member list of intended recipients of the voice message from the voice message, removes the intended recipients of the voice message that are connected to the router from the member list, and transmits the voice message to the intended recipients of the voice message that are connected to the router, and routes the voice message to at least one additional router if there are remaining intended recipients in the member list.

2. The system of claim 1, the plurality of mobile communication units comprising a plurality of two-way radio devices with integrated routers being operative to route voice packets between two-way radio devices that are beyond the line of sight transmission capabilities of the two-way radio devices.

3. The system of claim 1, the router adapted to route voice messages to at least one of different radio types and similar radio types having at least one of different frequency hopping schemes and different cryptographic variable sets.

4. The system of claim 1, the router being communicatively coupled to a plurality of other routers integrated into respective mobile communication units of the plurality of mobile communication units, the router determines an optimal routing path for the voice messages through the plurality of other routers based on transmission range of the mobile communication unit and at least one parameter.

5. The system of claim 4, the at least one parameter being at least one of time, priority, router location, mobile communication unit location, bandwidth and load sharing.

6. The system of claim 1, further comprising a configuration manager that provides the router with configuration information, the router utilizing the configuration information to create a router database defining connections between the plurality of mobile communication units and at least one router in the network.

7. The system of claim 6, the configuration manager employs a network definition defining members of the network and member parameters defining at least one of member type, member communication parameters and member security parameters in generating the configuration information.

8. The system of claim 6, the router performing administrative updates periodically to update the router database to determine if at least one of new members have entered the network, if current members have moved, and a current location of other routers.

9. The system of claim 1, the voice message being digitized voice packets that contain routing information in headers of the digitized voice packets, the router determines an optimal routing path based on the router database and information in the headers.

10. A two-way radio communication system comprising:
a plurality of two-way radio devices operative to convert speech patterns to digitized voice packets and wirelessly transmit digitized voice packets over at least one radio frequency link, the plurality of two-way radio devices being configured as a self-contained mobile network infrastructure;
a router having a processor and a memory, the memory stores a router database defining members within communication range of the router, the router having a routing algorithm that extracts routing information comprising a member list of intended recipient destination two-way radio devices of the digitized voice packets from the digitized voice packets and utilizes the extracted routing information and router database to determine an optimal routing path from a plurality of routing paths to the destination two-way radio devices for the digitized voice packets, the routing algorithm reconfiguring the optimal routing path and removing members within communication range of the router from the member list, transmitting the digitized voice packets to the destination two-way radio devices that are within the communication range of the router and routing the digitized voice packets to at least one additional router if there are remaining intended recipients of the digitized voice packets in the member list.

11. The system of claim 10, the plurality of two-way radio devices comprising a plurality of half-duplex line-of-sight two-way radio devices with integrated routers.

12. The system of claim 11, the plurality of half-duplex line-of-sight two-way radio devices operative to transmit data information and priority information in addition to digitized voice packets.

13. The system of claim 10, the router having a plurality of different ports that provide connections to two-way radio communication links through different two-way radio devices.

14. The system of claim 13, the different two-way radio devices comprising at least one different radio type having different communication parameters and having different security parameters.

15. The system of claim 10, the router having a routing path algorithm that determines a routing path for the voice packets based on at least one of time, priority, router location, mobile communication unit location, bandwidth and load sharing.

16. The system of claim 10 the router having an algorithm for receiving configuration information to create a router database defining connections between routers and two-way radio devices in the network, the router using the router database and information in the digitized voice packets to route the digitizes voice packets to at least one desired destination.

17. The system of claim 10, the router having an algorithm that performs administrative updates to update the router database, the router path algorithm dynamically updating router information in the digitized voice packet with an expected optimal path based on updates to the router database.

18. The system of claim 10, the digitized voice packets being one of Voice Over Internet Protocol packets and Network Voice Protocol packets.

19. A half duplex two-way radio communication system having a self-contained infrastructure defining a mobile network, the system comprising:
   a plurality of half-duplex two-way radio devices operative to convert speech patterns to voice messages and having integrated means for routing digitized voice packets between the plurality of two-way radio devices;
   means for configuring the integrated means for routing to provide the means for routing with a router database defining connections between members in the network;
   means for updating the router database based on changes in the network;
   means for determining an optimal routing path from a plurality of routing paths based on the router database and routing information in the digitized voice packets, the routing information including a member list of intended recipients of the digitized voice packets, the means for determining also providing to the digitized voice packets new routing information and removing members from the member list based on members connected to the means for routing; and
   means for retransmitting the digitized voice packets to the members connected to the means for routing and for routing the digitized voice packets to at least one additional means for routing if there are remaining intended recipients of the digitized voice packets on the member list.

20. A method for communicating voice messages within a two-way radio communication system, the method comprising:
   a first mobile communication unit receiving a voice message from a second mobile communication unit of the two-way radio communication system;
   the first mobile communication unit extracting routing information from the voice message, the routing information comprising a member list of intended recipients of the voice message;
   the first mobile communication unit determining an optimal routing path based on routing information and a router database defining member connections within the two-way radio communication system and connections to mobile communication units within the range of the first mobile communication unit;
   the first mobile communication unit modifying the routing information in the voice message based on the determined optimal path and removing recipients of the voice message in the member list that are within the range of the first mobile communication unit; and
   the first mobile communication unit retransmitting the voice message including the modified routing information to at least one other mobile communication unit in the two-way radio communication system within the range of the first mobile communication unit according to the determined optimal path, and to at least one additional mobile communication unit if there are remaining intended recipients of the voice message in the member list.

21. The method of claim 20, further comprising dynamically updating the router database based on member changes in the two-way radio communication system.

22. The method of claim 20, further comprising receiving configuration information having at least one parameter defining a network of members of the two-way radio communication system and generating the router database based on the configuration information.

23. The method of claim 20, the voice message being processed as at least one digitized voice packet having a header portion containing the routing information.

* * * * *